United States Patent [19]
Hubbard

[11] 4,067,317
[45] Jan. 10, 1978

[54] SOLAR ENERGY COLLECTOR PANEL

[75] Inventor: S. Eugene Hubbard, Niles, Mich.

[73] Assignee: Kawneer Company, Inc., Niles, Mich.

[21] Appl. No.: 697,488

[22] Filed: June 18, 1976

[51] Int. Cl.$^2$ .............................................. F24J 3/02
[52] U.S. Cl. .................................. 126/271; 165/170;
165/172; 165/175
[58] Field of Search ............... 126/270, 271; 237/1 A;
165/170, 175, 171–174

[56] References Cited

U.S. PATENT DOCUMENTS

| 1,003,514 | 9/1911 | Rountree | 126/271 |
| 1,119,063 | 12/1914 | Burnap | 126/271 |
| 3,239,000 | 3/1966 | Meagher | 127/271 |
| 3,934,323 | 1/1976 | Ford et al. | 126/271 |
| 3,937,208 | 2/1976 | Katz | 126/271 |
| 3,987,784 | 10/1976 | Godrick | 126/271 |
| 3,996,918 | 12/1976 | Quick | 126/270 |

Primary Examiner—Kenneth W. Sprague
Assistant Examiner—James C. Yeung
Attorney, Agent, or Firm—Mason, Kolehmainen, Rathburn & Wyss

[57] ABSTRACT

A solar energy collecting panel includes a pair of elongated spaced apart tubular fluid headers formed of heat conductive material and a plurality of elongated hollow tubular panel elements or risers formed of heat conductive material extended between the headers. The panel elements have an outer wall adapted to face and absorb solar radiation and transfer the heat directly into fluid passing through the tubular passages of the risers which are arranged in edge to edge, side by side relation with opposite ends of the risers connected in direct fluid communication with a fluid passage in the headers through openings in a wall section thereof. The panels are especially adapted for interconnection together in an array and the headers in the panels are formed with a perforated inner wall dividing the fluid flow into a pair of passages; one passage for directing some of the fluid between the headers and the risers and the other passage acting as a plenum chamber or conduit for passing the fluid to the next adjacent panel.

17 Claims, 19 Drawing Figures

SOLAR ENERGY COLLECTOR PANEL

BACKGROUND OF THE INVENTION

1. Field of the Invention

The present invention relates to a new and improved solar energy collector panel adapted to collect solar radiation for heating fluids such as water, air, ethylene glycol, etc. As natural gas and petroleum reserves become scarcer, more attention is being directed toward extracting heat energy in useable form from solar radiation. Even in the Northern latitudes of this country where a greater number of overcast days occur in comparison to the Southern and Southwestern sections, there is considerable solar energy available for collection if highly efficient solar energy collecting panels are used.

2. Description of the Prior Art

One of the problems with solar collecting panels is the relatively high cost for each BTU of energy derived. Gradually, costs have been reduced as more efficient designs and processes have been developed. Many prior art solar energy panels utilize a flat sheet of heat absorbent metal to which are attached fluid conduit tubes. The tubes are normally attached by welding, brazing or mechanical means. Panels made this way suffer a loss of efficiency because of resistance to heat flow through the sheet to the tubes and through the joints between the sheet and the tubes. In addition, hot areas develop which cause losses because of more re-radiation of some of the energy received from these hotter areas. Other panels utilize finned tubing which is laid out in a pattern with elongated parallel runs supported on a backing board. A wide variety of bubble plate or expanded plate type solar collectors are common. Most of these prior art devices suffer from low efficiency, relatively high cost per unit output of heat derived per square foot of collector area. More over, installation of these units is difficult and costly because they require job constructed structural supports and job assembled external piping and pipe insulation.

OBJECTS AND ADVANTAGES OF THE PRESENT INVENTION

A new and improved solar energy collecting panel in accordance with the present invention overcomes many of the difficulties of the prior art units. Accordingly, it is an object of the present invention to provide a new and improved highly efficient solar panel for collecting solar radiation from the sun.

Another object is to provide a new and improved solar energy collector panel which is more efficient in operation than the prior art panels and one which is capable of delivering as useful output a greater percentage of the energy that is collected from the available solar radiation.

Another object of the present invention is to provide a new and improved efficient solar energy collector panel in which the direction of heat flow between the collecting surface and the fluid to be heated is substantially normal to the collecting surface.

Another object of the present invention is to provide a new and improved solar energy collector panel in which the heat flow is substantially uni-directional between the collecting surface and the fluid to be heated.

Another object of the present invention is to provide a new and improved solar energy collector in which the thermal resistance between the collecting surface and the fluid to be heated is substantially reduced.

Yet another object of the present invention is to provide a new and improved solar collecting panel in which the collecting surface temperatures are not significantly higher than the temperature of the continuous fluid to be heated.

Another object is to provide a solar panel of the type described which operates with a more uniform temperature distribution laterally or horizontally of the panel and thus eliminates hot areas which cause re-radiation losses.

Still another object of the present invention is to provide a new and improved solar energy collector panel which is low in cost, relatively light in weight and yet strong to withstand the stress of exposure to heavy wind, rain and snow.

Still another object of the present invention is to provide a new and improved solar heat collector panel which is easy to manufacture and install or erect on a building structure or other location.

Another object is to provide a new and improved modular solar energy collector panel which is especially well adapted to be easily connected into a system or array employing a plurality of such panels.

Yet another object of the present invention is to provide a new and improved solar energy collector panel element that can be used as a component of panel assemblies of many different types.

Another object of the present invention is to provide a new and improved solar energy collector panel which is especially well adapted to installation on previously existing structures or new structures not specifically designed to use solar energy.

Another object of the present invention is to provide a new and improved solar energy collector panel which is suitable for both low and high temperature operation.

Yet another object of the present invention is to provide a new and improved solar energy collector panel element which can be used as a replacement element on previously existing panels and supporting structures.

Another object of the present invention is to provide a new and improved solar energy collector panel in which the basic panel elements are constructed of aluminum extrusions without heat resistive junctions or joints which tend to increase the loss of collected solar energy.

Another object of the invention is to provide a new and improved solar energy collector panel system wherein the collective surface has exceptionally high solar radiation absorbtive characteristics with little or no reflection or re-radiation of energy therefrom.

Yet another object of the present invention is to provide a new and improved solar energy collector panel having better insulation and higher efficiency in preventing re-radiation and conductive loss of heat to the surrounding media.

Another object of the present invention is to provide a new and improved solar energy collector panel in which the collecting surface is durable with respect to temperature, age and handling.

Yet another object of the invention is to provide a new and improved array of solar energy collector panels.

Another object of the invention is to provide a new and improved solar energy collecting panel especially adapted for connection with other panels in an array with a minimum of external piping or plumbing being required.

Still another object of the invention is to provide a new and improved solar energy collecting panel having at least one header having internal means for dividing the fluid flow in separate channels; one for feeding the panel risers and one for directing fluid flow into an adjacent interconnected panel.

Another object of the invention is to provide a new and improved solar energy collector panel of the character described wherein one of the separate channels of the header serves as a plenum chamber for supplying fluid to the other channel.

Yet another object of the invention is to provide a new and improved collector panel of the character described having an internal wall section for directing the flow into a pair of channels with openings provided in the wall section which are sized to distribute fluid between the channels to meet the requirements of the risers in the panel and to supply fluid to other panels interconnected in an array.

BRIEF SUMMARY OF THE INVENTION

The foregoing and other objects and advantages of the present invention are accomplished in one of the illustrative embodiments comprising a new and improved solar energy collector panel for receiving and collecting solar radiation energy. The panel comprises a pair of elongated, horizontal, spaced apart, tubular fluid headers, each formed of heat conductive material such as aluminum and including a pair of spaced walls defining a longitudinal recess extending along opposite facing portions of the parallel headers. A plurality of elongated hollow tubular panel elements or risers, also formed of heat conductive material are connected to extend normally between the headers and contain the flow of fluid therebetween. Each of the risers includes an outer wall having a surface especially adapted to face and absorb solar radiation from the sun and conduct the energy so absorbed to heat a fluid passed through the risers between the fluid headers. The panel elements or risers are arranged in edge to edge, side by side relation between the fluid headers which are positioned at opposite ends. The ends of the risers are sealed against and seated in facing recesses of the parallel headers and are in direct fluid communication with the headers through openings in the adjacent header walls. The panels are specifically adapted for easy fluid connection with adjacent panels in an array and the headers are formed with an internal wall section for dividing the fluid flow into two separate channels. One channel supplies fluid to the risers of the panel and the other channel acts as a plenum chamber for supplying fluid to the one channel through sized openings in the internal wall section and for supplying fluid to the next adjacent panel in the array. The panels are supported in structural frames suitable for withstanding the weather and requiring little periodic maintenance.

BRIEF DESCRIPTION OF THE DRAWINGS

For better understanding of the present invention, reference should be had to the following detailed description taken in conjunction with the claims and drawings, in which:

DESCRIPTION OF THE PREFERRED EMBODIMENTS

Figure 1:
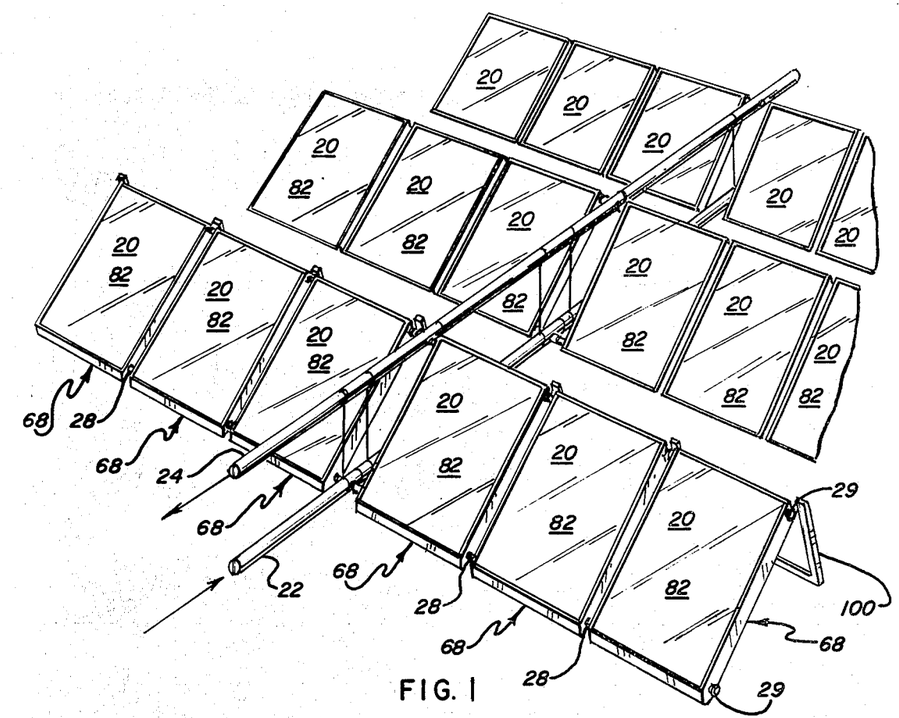
FIG. 1 is a perspective view showing an operating array of solar energy collector panels constructed in accordance with the features of the present invention.

Referring now more particularly to the drawings, in FIG. 1, is illustrated an array of solar energy collector panels 20 constructed in accordance with the features of the present invention and shown as installed at a collection site such as a roof top for collection of radiant energy from the sun moving overhead. As illustrated in FIG. 1, the array comprises a plurality of the panels arranged in columns and rows and the panels of each row are shown as connected in parallel fluid communication with one another while successive rows of panels are also connected in parallel fluid communication row by row. The collector panels 20 are especially adapted for use in collecting and absorbing the available energy from solar radiation and efficiently converting this energy into heat energy for elevating the temperature of a flowing fluid such as water, air, ethylene glycol, etc. The array of panels is supplied with heat exchange fluid from a centrally positioned, lower fluid supply conduit 22 and heated fluid from the array of panels is removed via an upper, central fluid conduit 24. As illustrated, these fluid supply and return conduits bisect each row of panels in the array and the rows are aligned with respect to the path of the sun for any particular geographical location so that a maximum amount of solar radiation will fall upon the panels as the sun moves across its path. The panels are also arranged to lie with their energy absorptive outer faces on planes at selected angles relative to the horizontal so that a most efficient absorption of the sun's rays occurs as the sun passes over the array. For any geographic location, a particular alignment of the rows of the array with respect to true North and a particular selected angular position of the face of the panels relative to the horizon, will result in a most efficient collection of energy on an average basis throughout the year. However, if desired, the position and the angle of the panel faces may be modified to favor collection at a particular time of day, season of the year, or the position and angle of the panel faces can be adjusted from time to time to compensate for seasonal changes in the path of the sun relative to the earth's surface.

Figure 9:
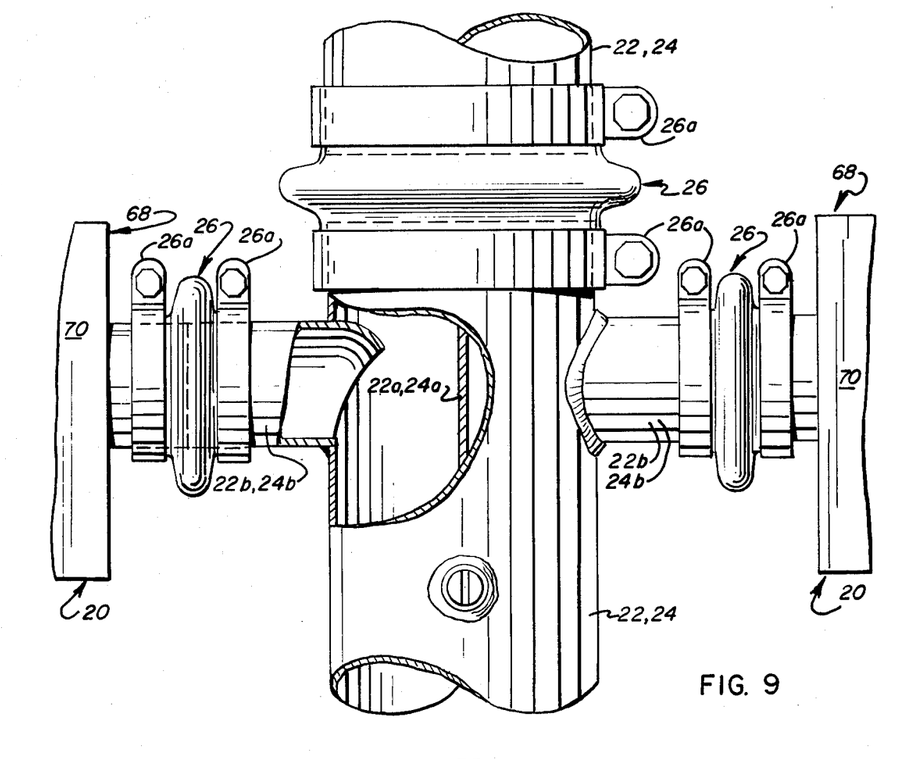
FIG. 9 is an enlarged, elevational view, with portions broken away and in section, illustrating a coupling system for interconnecting opposite row sections in an array of solar energy collector panels on opposite sides of a main fluid supply or return conduit.

Referring momentarily to FIG. 9, the upper and lower, supply and return conduits 22 and 24, respectively, are preferably circular in cross-section and each is provided with a centrally disposed, vertical divider wall 22a and 24a, respectively, for separating or dividing the fluid flow in the conduits with respect to panels 20 to the right and left in the array. Preferably, the conduits are formed of extruded aluminum or the like and dependent upon the number of panel rows in an array, a number of sections of conduits may be connected in end to end relation by flexible connectors 26 in order to accommodate relative expansion and contraction of the parts of the system. The connectors are attached to the ends of the conduits by clamping rings 26a to provide somewhat flexible, fluid-tight connections. At each point of take-off on the respective conduits 22 and 24, a pair of opposite, short, laterally extending nipples or branch conduits 22b and 24b, respectively, are provided. If not used, these branch conduits may be closed off by end caps (not shown). Normally, the branch conduits are connected to supply and return couplings on the adjacent solar energy collector panels 20 in each row by means of flexible connectors 28 attached in place with clamp rings 28a (FIG. 5).

Figure 5:
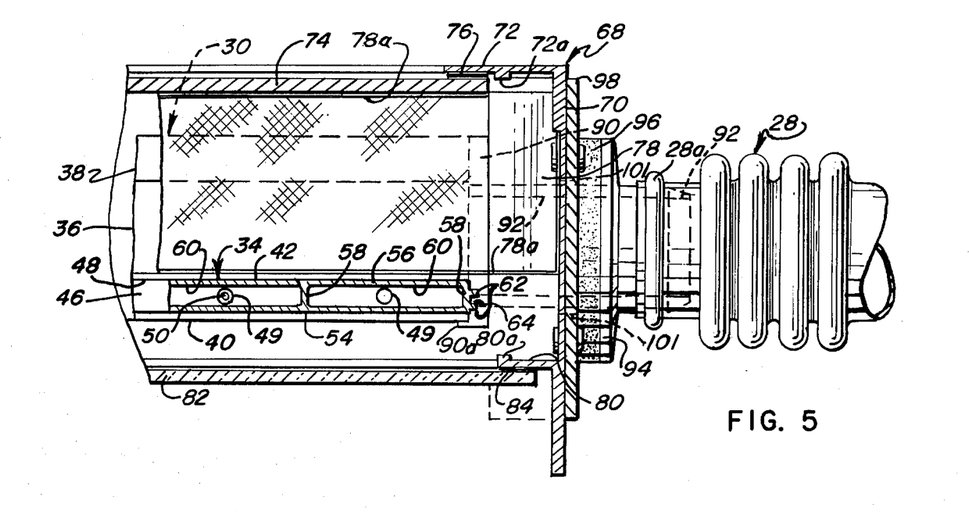
FIG. 5 is a fragmentary, horizontal, cross-sectional view taken substantially along the lines 5—5 of FIG. 4.
Figure 6:
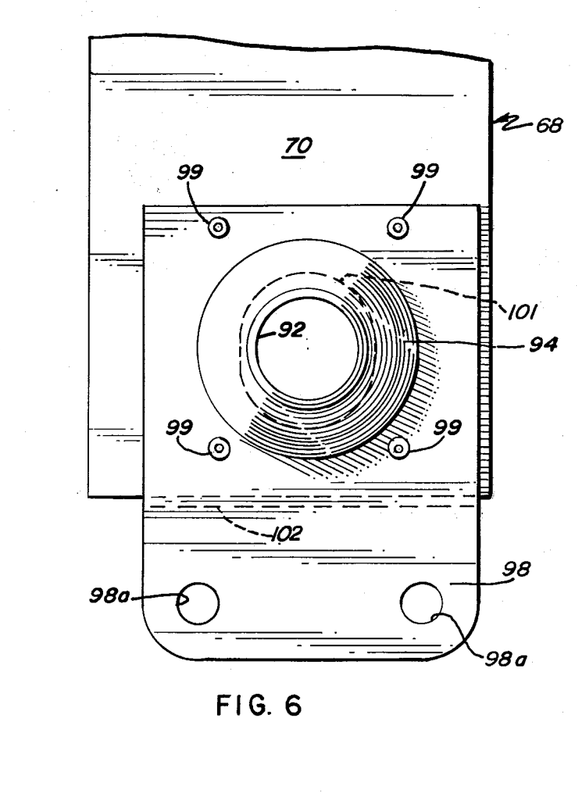
FIG. 6 is a fragmentary, elevational view, looking in the direction of the arrows 6—6 of FIG. 5.

Referring momentarily to FIG. 5, adjacent panels 20 in each row of the array are interconnected for fluid transfer by means of the radiator hose type, flexible connectors 28 secured at opposite ends to the coupling on the collector panels. These flexible connectors permit some adjustment of the relative positions of the panels in the array with respect to adjacent panels and also permit shifting of the conduits 22 and 24 with respect to the panels. This adjustment in relative position is needed because of variations in temperatures that occur during operation and in periods of shut down or non-operation.

In accordance with the present invention, each of the new and improved collector panels 20 includes a lower horizontally extending supply or cold fluid header 30 and a parallel upper return or hot fluid header 32. The parallel upper and lower headers of each panel are in direct fluid communication with one another through a plurality of elongated, hollow, tubular, upright panel elements or risers 34 which are arranged in edge to edge interlocked, side by side relation extending upwardly between the upper and lower headers. As shown schematically in FIG. 2, relatively cold heat exchange fluid enters at the lower end of each panel 20 as supplied from the conduit 22 and flows directly into the cold headers 30. As the fluid rises, it is heated by the energy collected from the solar radiation striking the panel elements 34, eventually passing into the upper header 32. Heated fluid collected in the upper headers 32 flows into the hot or heated fluid conduit 24. As the fluid flows through the headers 30 and 32 it is also heated by the solar energy falling on the exposed outer wall surfaces of the headers. Headers of adjacent panels in a row are coupled directly end to end, by the flexible connectors 28 and the outer panels in the rows are capped off as at 29.

Figure 4:
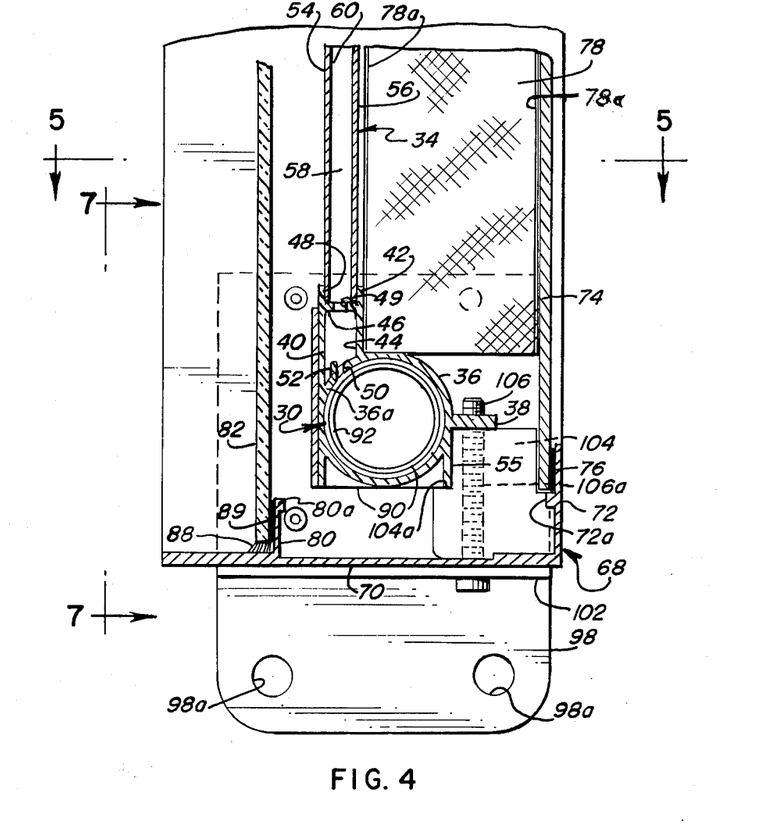
FIG. 4 is a fragmentary, vertical, cross-sectional view taken substantially along the lines 4—4 of FIG. 3.

In accordance with the present invention, and as shown in FIG. 4, the headers 30 and 32 are of identical profile and preferably are integrally formed of extruded aluminum which is highly heat conductive and which is strong, light and generally resistant to corrosion and rust. Each header includes a primary tubular conduit portion of circular cross-section 36 with a rearwardly extending relatively thick rib 38 along the back side at mid-level. A pair of spaced apart upstanding walls 40 and 42 provided on the opposite or front side of the header extrusion and the front wall extends well above and below the point of tangency with the circular cross-section portion 36 to provide additional energy collecting surface area. The outer face of the front wall is anodized and darkened in color making the surface highly absorptive of solar radiation with very little reflection of energy.

The upper portion of the outer wall 40 and the parallel wall element 42 form the side walls of a secondary tubular fluid conduit indicated by the numeral 44 which is smaller in area than the primary conduit 36. The secondary conduit is provided with a top wall 46 spaced below the upper edges of the side walls 40 and 42 to form a recess 48 for receiving a short length of the end portions of the upstanding panel elements 34. Communication between the end portions of the panel elements or risers 34 seated in the recess 48 and the secondary conduit section 44 of the headers is provided by means of a plurality of spaced apart, drilled apertures or openings 49 which are sized to provide for the proper volume flow of fluid between each panel element or riser and the headers at opposite ends thereof. Fluid communication between the primary circular sections 36 of the headers and the smaller secondary tubular conduit sections 44 is provided by drilled apertures or openings 50 which are axially aligned with selected ones of the apertures 49. The apertures 50 are drilled in curved intermediate wall segment 36a which divide the interior flow cross-section of the headers 30 and 32 between the primary, circular cross-section flow conduit 36 and the smaller secondary flow conduit 44. In order to aid in drilling the apertures 50, a small ridge 52 is integrally formed on the outwardly facing surface of the curved wall segment 36a and this ridge aids in starting and centering the end of a stepped diameter drill bit used for simultaneously drilling an aperture 50 and an aperture 49. The headers 30 and 32 are also provided with a back rib portion 55 parallel of the outer portion of the forward wall 40 and it is clear that the headers 30 and 32 are thus relatively strong, light in weight, and highly heat conductive to transmit energy received on the dark colored outer wall surface 40 into the fluid passing through the flow sections of the headers.

Figure 2:
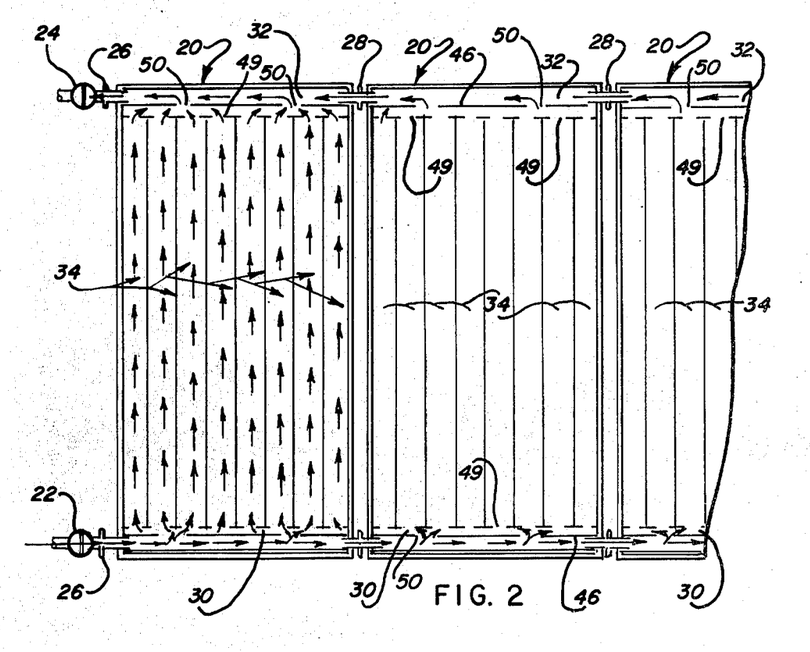
FIG. 2 is a schematic diagram illustrating the path of fluid flow through a row of panels in the array interconnected together in parallel flow operation.

Referring now to the schematic diagram of FIG. 2, the apertures 49 in the outer wall 46 of the headers are drilled in alignment with each of the hollow internal tubular flow conduit formed in upright panel elements or risers 34. The intermediate wall sections 36a of the headers are normally provided with somewhat fewer apertures 50 in order to achieve the desired division of flow and circulation. For example, if each upright panel element 34 includes three separate tubular segments therein, there will be provided three apertures 49 in the wall 46 of the headers 30 and 32 but only a single aperture 50 in the internal dividing wall 36a of the headers may be needed to feed fluid to the panel elements 34 through the apertures 49. By controlling the sizing and spacing of the respective apertures 49 and 50, the desired flow pattern in terms of volume and velocity can be achieved for maximum energy collection efficiency in the panels 20 and for proper division of the fluid flow between risers 34 of each panel and the headers 30 of succeeding panels in the array.

The larger primary flow conduit 36 of each header acts as a fluid plenum chamber for supplying and distributing the fluid to the secondary fluid conduit 44 and for supplying the primary flow conduit of the next succeeding header of an adjacent connected panel in the array. The internal wall section 36a and the apertures 50 permit the desired amount of fluid required by the panel risers 34 to be bled off or divided out of the main fluid stream in the primary conduit 36. This arrangement eliminates the need for extensive external piping between the panels to be installed in the field, as the fluid flows internally through the primary header flow conduits 36 direct from panel to panel in the array. It is thus only necessary to connect the headers of adjacent panels with the connector assemblies 28 and a great deal of erection and installation cost is eliminated when setting up an array of the panels 20 as shown in FIGS. 1 and 2.

Figure 3:
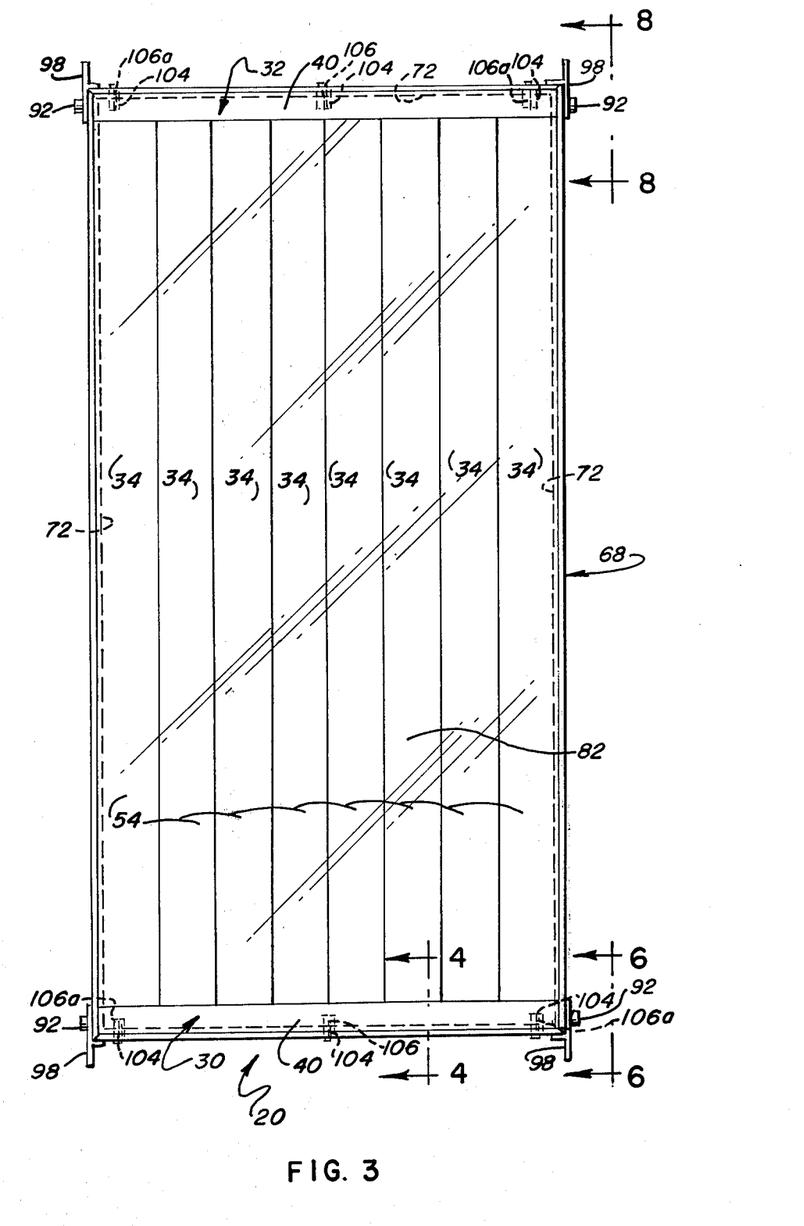
FIG. 3 is an enlarged front elevational view of a solar energy collector panel constructed in accordance with the features of the present invention.

Referring to FIGS. 3, 4 and 5, a number of panel elements 34 are connected to extend between each pair of upper and lower headers 30 and 32, with short length end portions of the panel elements being connected to and seated within the facing parallel recesses 48 formed between the wall sections 40 and 42 of the headers. Each panel element 34 includes an outer wall 54 having a planar outer surface which is anodized and darkened in color for the best absorption of the sun's radiation energy that strikes the panel. The panel elements are formed of extruded aluminum and include a parallel back wall 56 integrally joined to the front wall through a plurality of relatively narrow transverse edge and divider walls 58. Intermediate divider walls 58 are spaced between the opposite upright edges of the panel elements or risers and divide each element into a plurality of separate, hollow tubular, fluid flow conduit 60. Each flow conduit or section carries a low velocity flow of fluid between a receiving aperture 49 in the lower header 30 and an outlet aperture 49 in the upper header 32. As will be noted, the tubular, parallel flow conduits 60 channel a relatively thin sheet of flowing fluid moved directly in contact with the inward face of the outside wall 54 of the riser and the outward face of the wall in turn, receives direct radiation from the sun for transfer directly into the flowing fluid. It should also be noted that there are no heat resistive joints between the fluid flowing in the risers and the surface of the outer wall 54 of the risers which might reduce efficiency of heat collection and transfer. Also, there is no need for the collected heat energy to be conducted laterally through the metal of the collecting surface against the thermal resistance of the metal. There is little, if any, lateral heat flow in a horizontal direction across the risers and thus, no hot areas develop and re-radiation of energy is minimized. A substantially uniform temperature obtains horizontally of the panels making the panels extremely efficient.

Moreover, the headers 30 and 32 themselves, act as receiving surfaces for radiant energy with the outer surface of the walls 40 which are in direct communication with the fluid that is passing through the primary circular section 36 and secondary conduit section 44 thereof.

The panel elements or risers 34 are secured in edge to edge interlocked, side by side, upstanding position with their upper and lower ends seated in the opposed facing recesses 48 of the respective headers 30 and 32. Edge interlocking between adjacent outer edges of the panel elements 34 is accomplished by means of a pair of spaced apart ribs 62 (FIG. 5) on one edge forming a groove 64 therebetween adapted for receiving an appropriately positioned single rib 62 formed on the opposite edge of an adjacent panel element. This interlocking connection between the ribs and grooves of adjacent panel elements 34 provides for mechanical continuity. It will thus be seen that the energy absorbed from the sun's radiation that strikes the outer faces of the panel elements or risers 34 as well as the headers 30 and 32 flows essentially in a unidirectional path normal to the collecting surfaces for transfer to the fluid passing through the headers and risers and there are no heat resistive joints to interrupt or impede this direct flow path of heat energy absorbed into the fluid.

Opposite end portions of the risers 34 are seated within the recesses 48 of the headers and the inside surfaces of the header wall segments 40 and 42 are tapered slightly to receive the riser ends. The wall segments 40 and 42 of the headers 30 and 32 are fastened or joined to the outer surfaces of the front and back walls 54 and 56 of the risers 34 by suitable joining means such as soldering, brazing or adhesives and the end surfaces of the risers are similarly secured to the abutting surface of the header wall 46.

A pair of headers 30 and 32 and the requisite number of panel elements or risers 34 are assembled together as described, to provide a panel sub-assembly which is mounted as a unit in a frame 68 of generally rectangular shape (FIG. 3) formed from an elongated aluminum extrusion element of generally angle-shaped cross-section, as best shown in FIGS. 4 and 5. The extrusion element includes a wide flat outer side face 70 which is bent at the corners to form an edge wall for the panel assembly and the element is formed with a relatively short, stiffening leg 72 adjacent the back side of the panel edge wall. The legs or flange 72 of the frame element is formed with an elongated stop ridge 72a lying intermediate its width for serving as an edge stop for a back panel 74 formed of suitable fibre-board, plywood, sheet metal or the like, having a rectangular shape of appropriate dimension to seat within the outer panel frame 68. The back panel is sealed around its peripheral edge against the inside face of the back flanges 72 by means of a sealing tape 76 having adhesive on both sides or equivalent adhesive. The space between the inside surface of the back panel 74 and the back wall 56 of the panel elements 34 is substantially filled with a relatively thick, insulating panel of foam, fiberglass, or other material having suitable insulting characteristics. Preferably, the insulating panel has a reflective foil 78a on both surfaces adjacent the back side of the panel elements 34 to provide reflective insulation and to serve as a vapor barrier to prevent the release of gases inside the collector panel by the insulation material.

The frame element also includes an intermediate flange 80 parallel of the back flange 72 and spaced between the forward edge of the side face 70 and the back flange. The flange 80 is formed with a thickened outer edge portion 80a and provides support for a glazing panel 82 secured in place against the outer surface of the flange. Solar radiation passes through the glass panel 82 and is absorbed by the darkened outer surfaces on the wall 54 of the panel elements 34 and the darkened outer surface on the outer wall face 40 of the headers 30 and 32. The glazing panel is secured in place against the flange 80 around its periphery by means of a sealing tape 84 having an adhesive surface on both sides. The panel is set upon mounting blocks 86 (FIG. 7) and suitable weather sealant material 88 (FIG. 4) is provided to seal around the peripheral edges between the glass panel and inside surface of the adjacent side face 70 of the rectangular frame 68.

Figure 7:
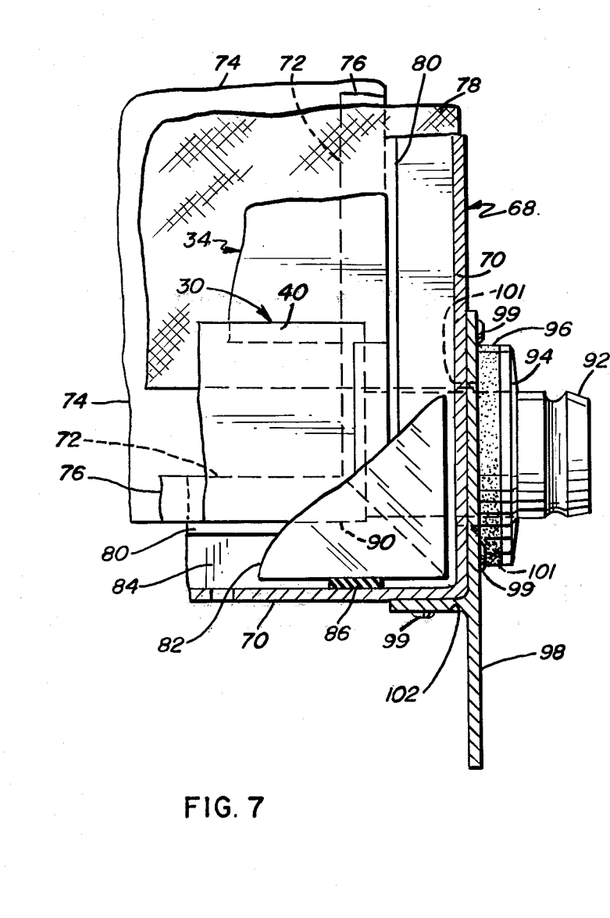
FIG. 7 is a fragmentary, elevational view, with portions broken away and in section, taken substantially along the lines 7—7 of FIG. 4.
Figure 8:
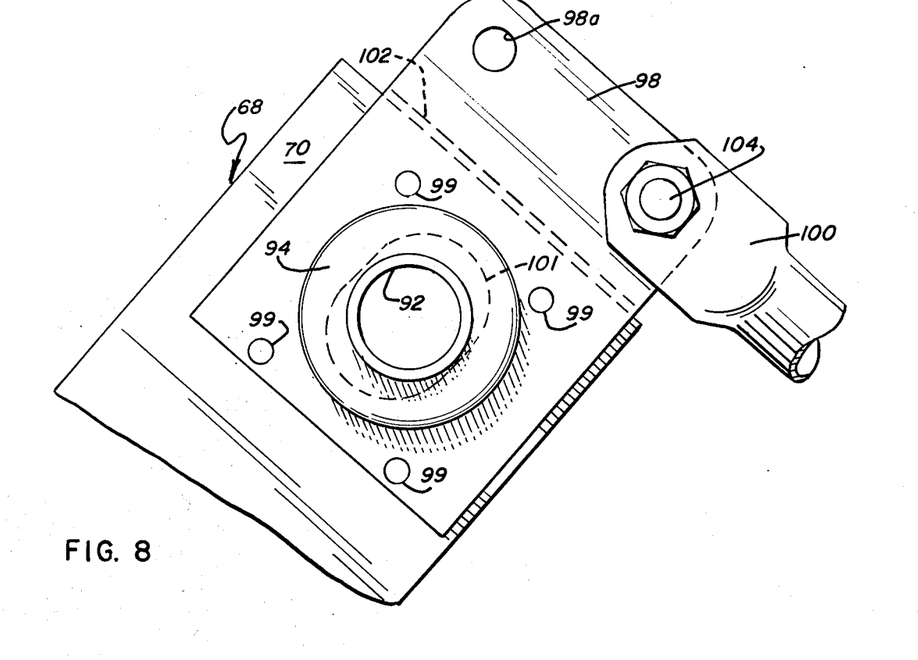
FIG. 8 is a fragmentary, vertical, elevational view looking in the direction of the arrows 8—8 of FIG. 3.

In accordance with the present invention, the opposite ends of the headers 30 and 32 are enclosed by end caps 90 secured thereto with suitable fasteners or by brazing, welding or the like to provide a positive seal. The end caps are formed with a circular opening therein to receive the end of a nipple type coupling 92 which extends outwardly through an opening in the side face 70 of the support frame 68. The outer end of the couplings are either capped off when not connected to another panel or are connected to couplings on adjacent solar panels by means of flexible connectors 28 as previously described. As best shown in FIG. 7, the outer end portion of the nipple couplings are tapered and are provided with a groove for receiving a clamping ring 28a. An annular flange or ring 94 is spaced inwardly from the outer end of the coupling for pressing engagement with a deformable foam filter 96 of doughnut or annular shape. The filter 96 bears inwardly against the outer surface of a corner bracket 98 secured to the side face 70 of the panel frame 68 with suitable fasteners 99. Each corner bracket includes an outwardly projecting vertical segment having a pair of spaced apart apertures 98a therein to facilitate connection of the bracket with a supporting brace member 100 (FIG. 1 and 8) for supporting the panels in place for pivotal movement on a horizontal support rod (not shown). The brackets 98 include a transverse flange extending inwardly thereof intermediate the opposite ends and the flange is secured to the side face 70 of the horizontals in the frame 68 by suitable fasteners 99 as shown in FIG. 7 to reinforce and support the corner of the frame.

Each panel 20 includes four of the brackets 98 with a bracket at each corner and all of these brackets are identical. The angle braces 100 are attached to the brackets by means of nut and bolt assemblies 104 and the brackets 98 and formed with elongated openings 101 therein somewhat larger than the outer diameter of the nipple coupling 92 which projects therethrough to accommodate contraction and expansion. The doughnut shaped filters 96 between the outer surface of the brackets and the inside surface of the flanges 94 on the nipple couplings 92 permit air flow in and out of the interior of the panel frame but filter out dirt and dust so that the surfaces of the elements remain clean.

In accordance with the present invention, in order to accommodate expansion and contraction of the heat absorbing headers 30 and 32, and panel elements 34 of each panel subassembly mounted in the rectangular frame 68, the lower header 30 is supported on a plurality of rigid insulating spacer blocks 104. One of the blocks is centrally positioned on the lower horizontal member of the support frame 68. These support blocks are best shown in FIGS. 3 and 4 and as shown in FIG. 3, a total of six support blocks are utilized for supporting the header and panel element sub-assembly within the rectangular frame 68. The blocks are formed of molded plastic material having good heat insulating characteristics and relatively high strength, such as "NYLON" or "TEFLON". The stiffening flange 38 of the lower header 30 is adapted to rest on the upper surface of the support blocks and in the centrally positioned lower support block a threaded mounting screw 106 is extended upwardly from the lower frame element through a bore within the support block and threadedly engages and secures the flange 38 of the lower header against the upper surface of the central support block. The other lower support blocks 104 are disposed on opposite sides of the central block and are secured to the lower frame element by somewhat shorter screws 106a (dotted lines, FIG. 4). The flange 38 of the header is not positively secured to the top of the outside blocks and merely rests thereon so that as the header expands and contracts in length as it heats and cools relative sliding movement on the block 104 which is fixedly attached to the frame is permitted. The upper support blocks 104 are similar in design to the lower support blocks and provide for positive spacing support between the back panel 74 and the flange 55 of the upper header 32. As shown in FIG. 4, the forward edge of the support blocks are provided with a shoulder 104a against which the flange 55 of the header is seated. Threaded engagement is not provided between the lower end of the central threaded fastener 106 and the flange 38 on the upper header 32 so that the flange is centered but yet is free to move up and down on the lower end of the fastener as the elements 34 expand and contract. The lower surface of the upper blocks are normally spaced above the upper surface of the flange 38 of the upper header 32 so that as the panel elements 34 expand in length when heated up, the expansion can be readily accommodated with continuing sliding engagement between the back flange 55 of the upper header and the upstanding surface of the shouldered portion 104a of the spacer blocks. As described, the insulating support blocks 104 and the fasteners 106 and 106a secure the headers and panel element sub-assembly in a sort of floating position within the frame 68 permitting lateral expansion on both sides of the vertical center and upward expansion from the lower header 30 as the temperatures become higher.

Referring now to FIGS. 10-13, therein is illustrated another embodiment of a solar energy collector panel constructed in accordance with the features of the present invention and referred to generally by the reference numeral 120. Parts and components of the embodiment of FIGS. 10-13 that are similar or identical to those of the previously described embodiment will be given the same reference numerals elevated by 100 and only the primary differences in the two embodiments or components of the assemblies will be described in detail.

Figure 10:
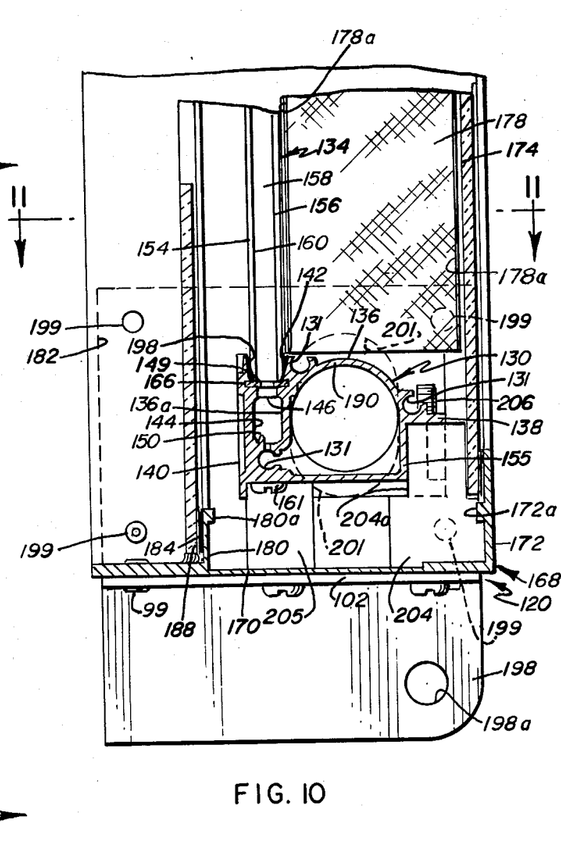
FIG. 10 is a fragmentary, vertical, sectional view similar to FIG. 4, but illustrating another embodiment of a solar collector panel constructed in accordance with the features of the present invention.
Figure 11:
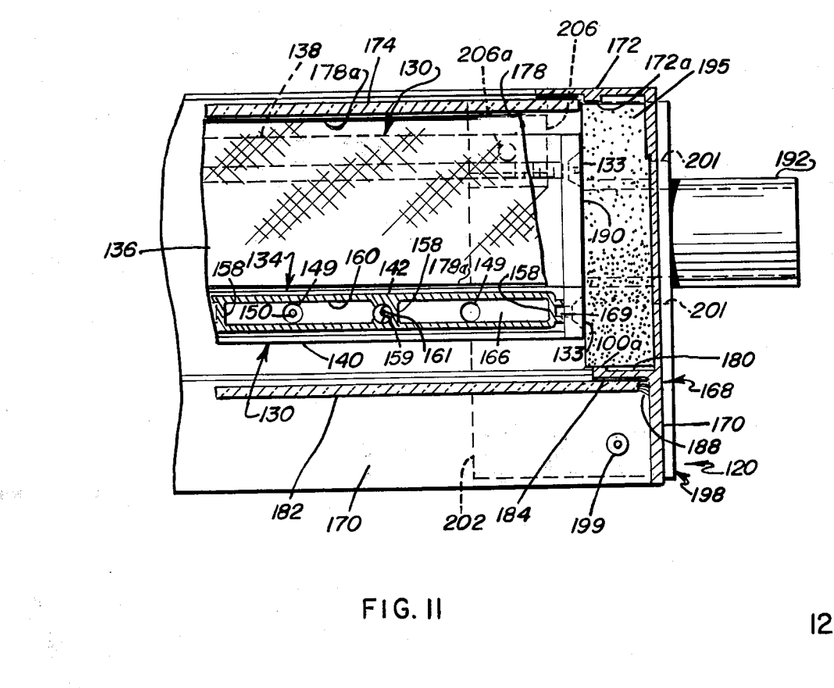
FIG. 11 is a fragmentary, horizontal, sectional view taken substantially along the lines 11—11 of FIG. 10.
Figure 12:
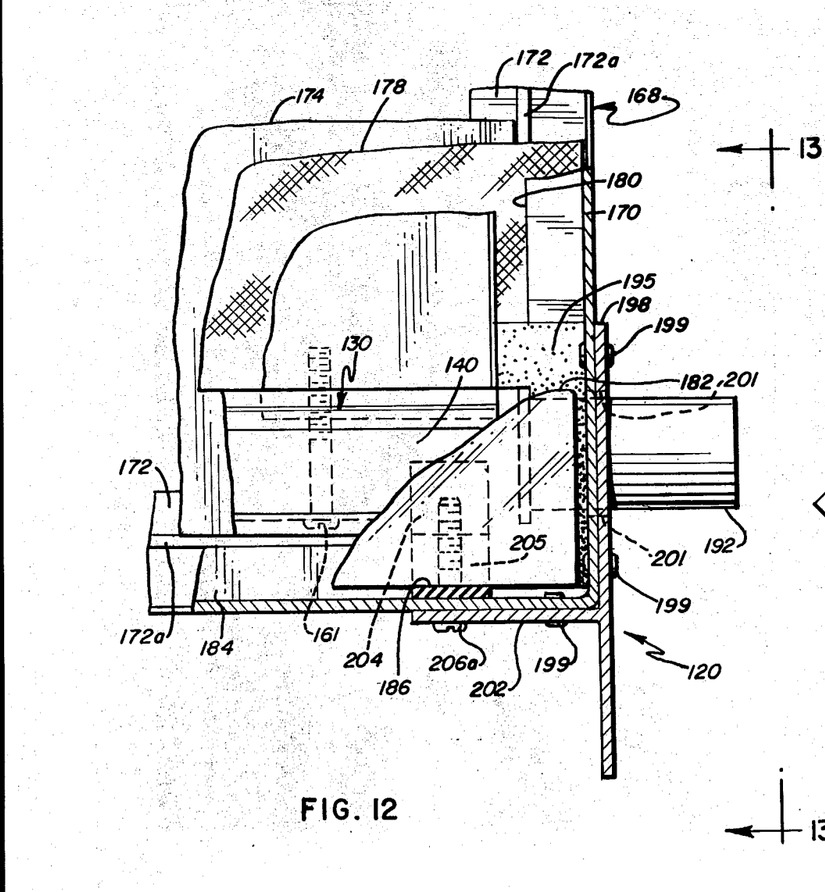
FIG. 12 is a fragmentary, front elevational view, looking in the direction of the arrows 12—12 of FIG. 10.
Figure 13:
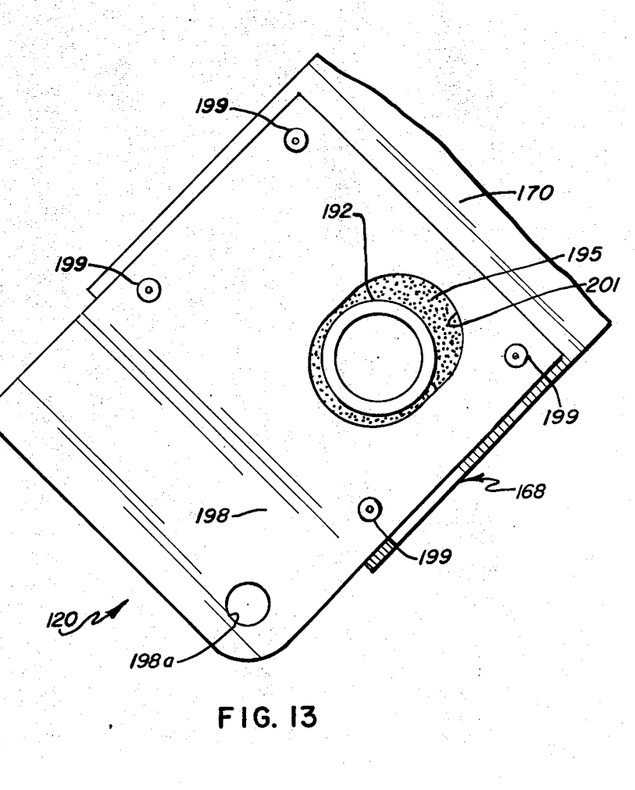
FIG. 13 is a vertical, side elevational view looking in the direction of the arrows 13—13 of FIG. 12.

In accordance with the present invention, the solar energy collector panels 120 employ a modified form of headers 130 and 132 and a modified form of riser or panel elements 134 interconnected between the upper and lower headers. As best shown in FIGS. 10 and 11, the upper and lower headers are of integral construction of extruded aluminum having a primary flow conduit 136 with an internal wall 136a separating the primary flow conduit and a smaller secondary flow conduit 144 of rectangular cross-section. The headers include a relatively wide upstanding front wall 140 spaced forward of a shorter upstanding wall 142 to form a recess 148 for receiving short end portions of the riser or panel elements 134 seated therein. The smaller secondary flow conduit 144 is provided with an integral top wall 146 forming the base of the recess and a plurality of drilled openings 149 are provided to pass fluid between the headers and the risers. A sealing gasket 166 on the upper side of the top wall seals against the abutting ends of the panel elements 134. The inner divider wall 136a is provided with drilled apertures 150 aligned with selected ones of the apertures 149 in the top wall 146 to direct flow between the main flow conduit 136 and the secondary smaller flow conduit 144 of the header.

As illustrated in FIG. 10, the headers 130 and 132 are formed with a plurality of elongated screw splines 131 approximately equilaterally spaced with respect to the profile of the cross-section of the headers. These screw splines are adapted to receive the threaded shanks of screw type fasteners 133 (FIG. 11) for securing the end caps 190 in place at opposite ends of each header. Suitable gaskets are provided between the caps and the end of the headers to positively seal the headers with a fluid-tight connection.

Referring now to the risers or panel elements 134, these elements are integrally formed of aluminum with a large thin planar front wall 154 and a spaced apart parallel back wall 156 separated by means of intermediate and edge transverse walls 158 which divide the panel elements into a plurality of separate, parallel fluid flow conduits 160.

In accordance with the present invention, the intermediate ones of the transverse walls 158 are relatively thick and are formed with screw splines 159 for receiving the threaded shank of screw type fasteners 161 used for securing the headers 130 and 132 to the ends of the risers.

The risers or panel elements are mounted between the headers in edge to edge interlocked, side by side upstanding array as in the prior embodiment. When the screws 161 extending into the screw splines 159 of the panel elements are tightened, the ends of the panel elements are compressed against the sealing gasket 166 to form a fluid tight seal and provide the completed heat absorptive sub-assemblies of the panels 120. The outer surface of the headers 130 and 132 and the risers 134 are anodized and are darkened in color as in the prior embodiment. Instead of an external filter, the panels 120 are provided with an internal sponge type filter 195 around the coupling 192.

Figure 14:
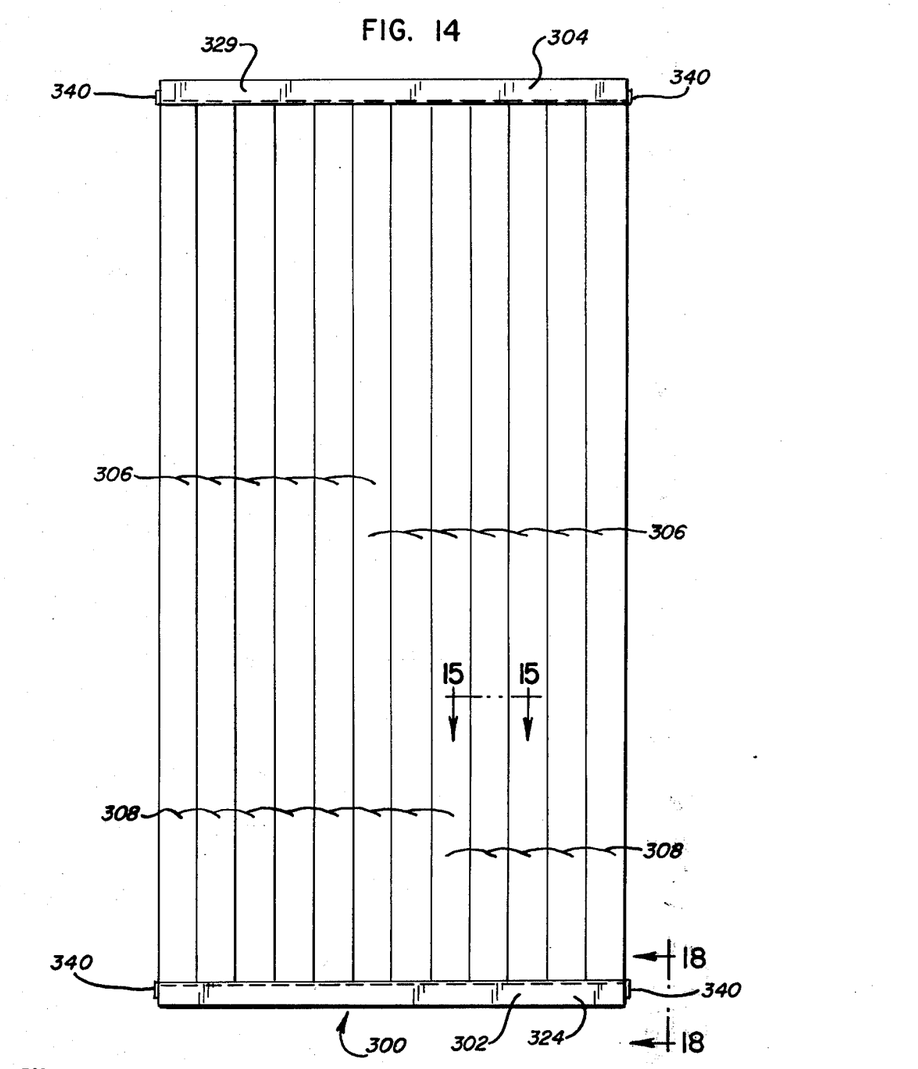
FIG. 14 is a front elevational view of yet another embodiment of a solar energy collector panel subassembly constructed in accordance with the features of the present invention.
Figure 15:
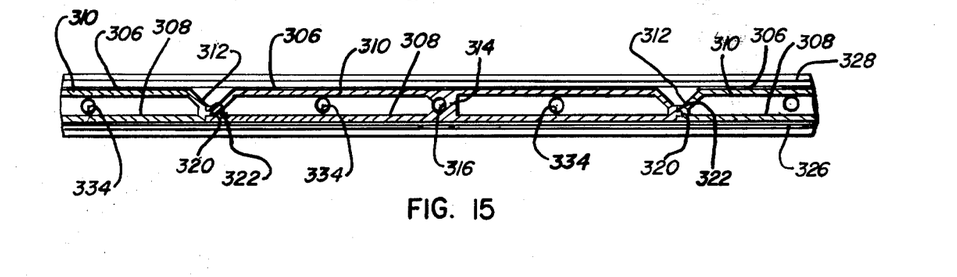
FIG. 15 is a fragmentary, transverse, cross-sectional view taken substantially along the lines 15—15 of FIG. 14.
Figure 16:
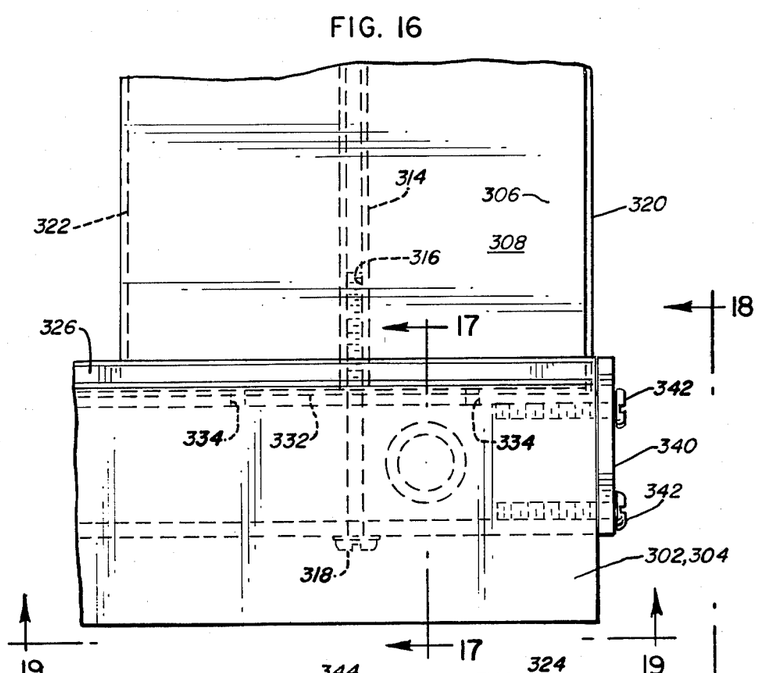
FIG. 16 is an enlarged, fragmentary, front elevational view of a lower corner portion of the panel of FIG. 14.

Referring now to FIGS. 14–19, therein is illustrated another embodiment of a solar energy absorbing panel sub-assembly 300 which is especially adapted for use as a replacement unit in solar panel structures or systems already in existence or for the construction of solar panels of a variety of external configurations. The sub-assembly as shown in FIG. 14, may be readily attached to a frame structure or a planar sheet such as a plywood, insulating board and the like and is especially advantageous in being light in weight, extremely efficient in operation and highly resistant to corrosion and weather.

Solar energy collector panel sub-assembly 300 includes a pair of identical relatively thin, hollow upper and lower headers 302 and 304 secured to the upper and lower end portions of a plurality of thin risers or panel elements 306 which are arranged in edge to edge interlocked, side by side relation (as best shown in FIG. 14). Each panel element includes a thin flat outer wall 308 having a planar outer wall surface treated by a process such as anodizing and darkened in color for better absorption of solar radiation with a minimum of reflection or re-radiation. The risers or panel elements include thin integrally formed rear walls 310 parallel to the front wall and structurally joined therewith by means of beveled or tapered outer side walls 312. Intermediate the side walls, the panel elements are provided with a relatively thick transverse wall 314 having a screw spline 316 formed therein for receiving the shank of a screw fastener 318 for securing the headers 302 and 304 to the risers 306. The outer opposite edge walls 312 of the panel elements are edge interlocked to adjacent elements by means of tongues 320 which extend into appropriate grooves 322.

Figure 17:
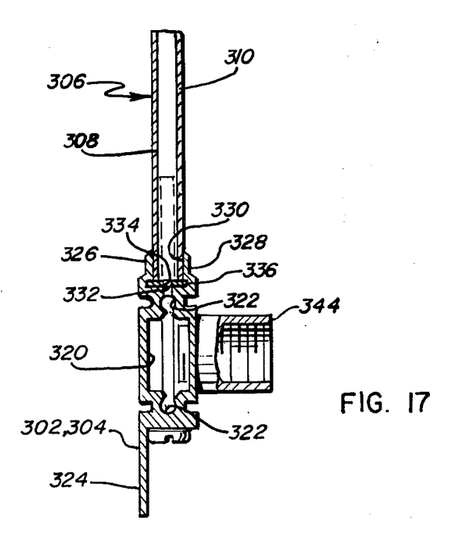
FIG. 17 is a fragmentary, vertical, cross-sectional view taken substantially along the lines 17—17 of FIG. 16.
Figure 18:
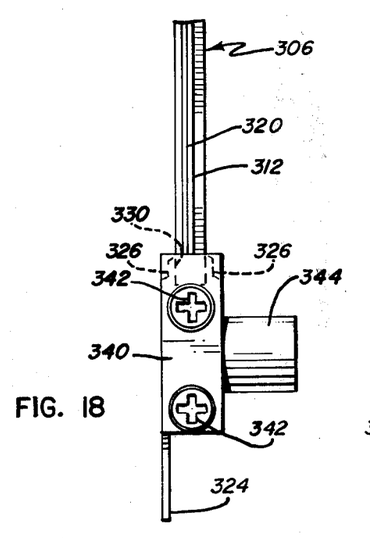
FIG. 18 is a fragmentary, side elevational view looking in the direction of the arrows 18—18 of FIG. 16.
Figure 19:
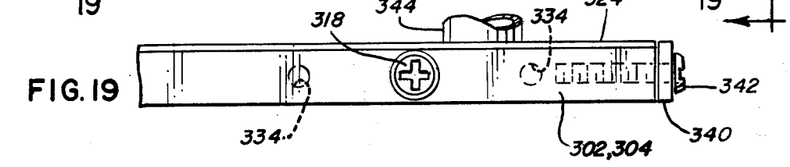
FIG. 19 is a fragmentary, lower end elevational view looking in the direction of the arrows 19—19 of FIG. 16.

The headers 302 and 304 are formed of hollow, aluminum extrusions and are generally rectangular in cross-section with an internal main flow passage 320 of generally rectangular cross-section disposed between a pair of screw splines 322 (FIG. 17). The headers include a forward or outside wall portion 324 extending beyond the tubular fluid passage 320 for absorbing additional radiant solar energy for transmission to the fluid flowing through the headers. In addition, the headers include a pair of relatively short, parallel, front and back wall structures 326 and 328 which define a recess 330 for seating short end portions of the risers or panel elements 306 as best shown in FIG. 17. A wall segment 332 formed with spaced apart apertures 334 is provided between the main flow conduit 320 and the recess 330 so that fluid is properly distributed between the interior fluid passages in the risers or panel elements 306 and the header. A sealing gasket 336 is positioned on the wall 332 to seal against the ends of the panel elements when the screws 318 are tightened into the screw splines 316.

In accordance with the invention, opposite ends of the headers 302 and 304 are closed or capped off by means of end caps 340 secured to the headers by means of screw fasteners 342 having threaded shanks extended into the screw splines 322, as best shown in FIGS. 16, 17, 18 and 19. Gaskets are provided between the ends of the headers and the end caps. Fluid is directed into and out of the headers 302 and 304 by means of nipple type, hollow tubular couplings 344 which are mounted in openings provided in the back wall of the headers as shown in FIG. 17.

From the foregoing it will be seen that the solar panel sub-assemblies shown in FIGS. 14–19 are readily assembled and are light in weight, strong and easily attached into existing panel systems. They can be used for replacement of the heat absorbing elements of other types of panel systems with a minimum of trouble and provide an extremely efficient operation in that the heat absorption on the outer face of the panel elements or risers 306 and headers 302 and 304 is substantially unidirectional and normal to the collecting surface passing directly from the outer surface of these elements into the sheet of in fluid flow passing through the members.

Although the present invention has been described with reference to several illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A solar panel for collecting solar radiation energy for heating fluid passing through the panel comprising:
   a plurality of elongated, spaced apart, hollow, tubular headers formed of heat conductive extruded metal and having an integrally formed internal wall defining separated primary and secondary flow conduits in communication with each other through one or more openings in said internal wall, said headers including an elongated recess formed on an outside wall having a bottom wall portion adjacent said secondary flow conduit,
   at least one pair of elongated hollow tubular panel elements formed of heat conductive extruded metal, each including a spaced apart inner and outer wall adapted to face and receive solar radiation for heating fluid passing through the interior of said element;
   said elements extending transversely between said headers in edge to edge relation with opposite ends of each of said panel elements seated in said recess and in fluid communication with said secondary flow conduits of said respective headers and abutting said bottom wall portions thereof;
   each of said headers having one or more openings therein for passing fluid between the secondary flow conduits in said headers and the adjacent hollow interior of said panel elements seated in said recess;
   each panel element including an elongated tongue along one longitudinal edge and an elongated groove along an opposite edge, said tongue and groove of adjacent panel elements interlocking together; and
   means at opposite ends of at least one of said headers for facilitating fluid interconnection between said primary flow conduits thereof with those of adjacent solar panels in an array.

2. The solar panel of claim 1 wherein said panel element comprises an elongated, hollow aluminum extrusion, having a black anodized finish on said outer wall face for absorbing solar radiation.

3. The solar panel of claim 1 wherein said panel element includes a relative thin, substantially flat outer wall and a plurality of separate integrally formed tubular fluid passages in adjacent side by side relation.

4. The solar panel of claim 3 wherein said panel element is formed with at least one longitudinally extending screw spline in a wall portion between a pair of said tubular passages for receiving the threaded shank of a screw fastener for securing a header and said panel element together.

5. The solar panel of claim 1 in combination with a structural frame means for supporting said headers and panel element therein, a transparent panel spaced apart outwardly of said outer wall of said panel element and means for securing said solar panel and transparent panel in said frame.

6. The combination of claim 5 including an insulating panel supported by said frame means positioned adjacent a back side of said solar panel for insulating the same.

7. The panel of claim 1 wherein said headers comprise elongated hollow aluminum extrusions.

8. The panel of claim 7 wherein said headers include a flat outer wall surface parallel of said outer walls of said panel elements.

9. The panel of claim 1 including a pair of end caps at opposite ends of said headers and fluid coupling means secured to said end caps for directing fluid flow into and out of said headers.

10. The panel of claim 9 wherein said aluminum headers include a plurality of integrally formed screw splines therein, for receiving the threaded shanks of screw fasteners for securing said end caps in place.

11. The solar panel of claim 1 wherein one of said header flow sections is of circular cross-section.

12. The solar panel of claim 1 wherein, said tongues and grooves are spaced closely adjacent said outer wall face of the panel elements.

13. The solar panel of claim 1 wherein said headers are formed with longitudinally extending recesses along opposite facing portions and said panel element includesopposite end portions extending into and seated in said recesses.

14. The solar panel of claim 13 wherein said recesses of said headers are formed with a pair of tapered, outwardly divergent wall surfaces for engagement with opposite sides of said end portions of said panel element.

15. In combination, a pair of panels as defined in claim 1 interconnected in an array, and removable connector means for interconnecting each of said headers of one panel with those of the other panel in end to end relation.

16. The panel of claim 1 wherein said primary flow conduit is substantially larger in cross-section than said secondary flow conduit to act as a fluid plenum chamber for supplying fluid to or receiving fluid from said secondary flow conduit.

17. The combination of claim 15 wherein said primary flow conduits of said headers in adjacent panels are in axial alignment in end to end relation.

* * * * *